July 3, 1928. 1,675,602
W. N. FAUST
SUSPENDED AERIAL CABLE TERMINAL
Filed Oct. 19, 1925
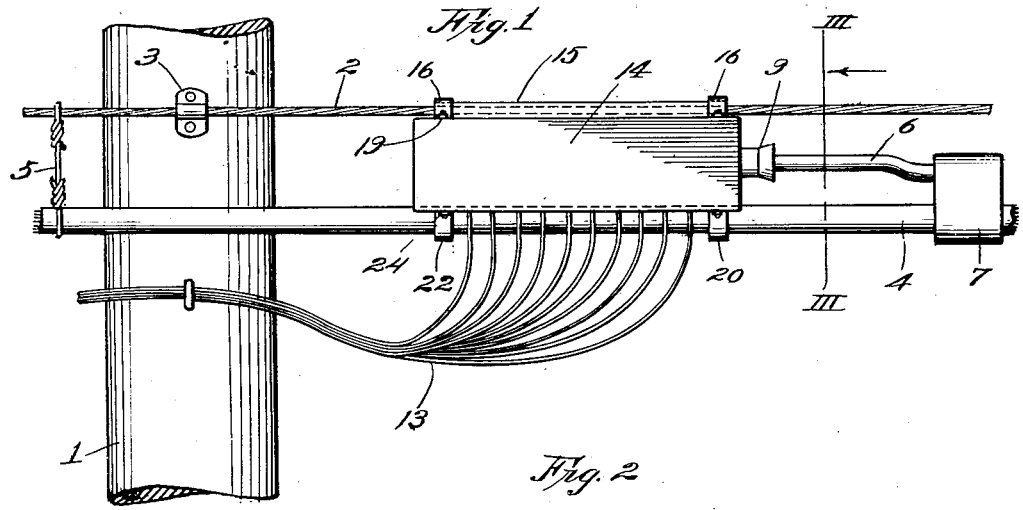
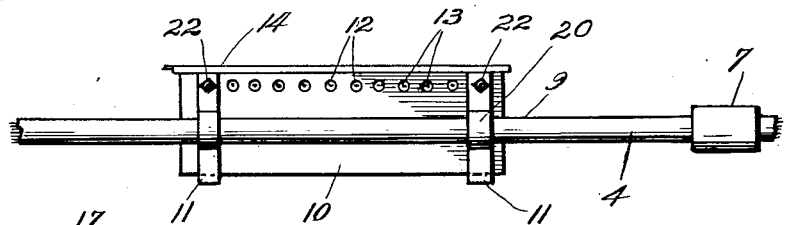
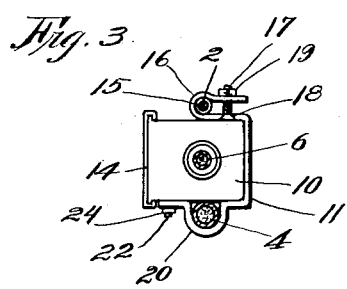
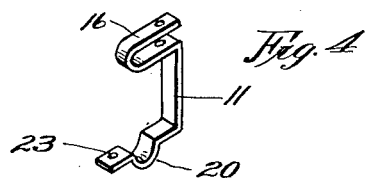
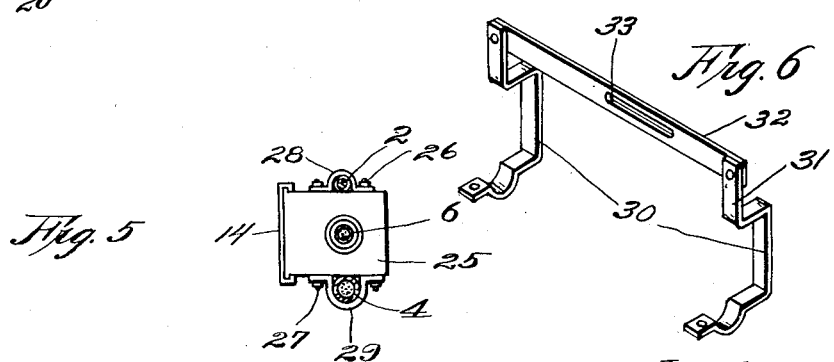
Inventor:
William N. Faust,
Witness:
R. E. Hamilton Patented July 3, 1928.

1,675,602

UNITED STATES PATENT OFFICE.

WILLIAM N. FAUST, OF KANSAS CITY, MISSOURI.

SUSPENDED AERIAL-CABLE TERMINAL.

Application filed October 19, 1925. Serial No. 63,429.

This invention relates to the installation of telephone terminal boxes of that type used to provide points of convenient connection for taps on the wires of a telephone feeder cable, whereby service wires may be connected to said feeder cable.

The present usual standard practice is to provide a terminal box secured to a pole some feet below the level of the feeder cable and then to connect said box and feeder cable by a tail which usually varies from three and one-half to seven feet in length, said tail cable being spliced in the feeder cable and then cleated down the pole, and ordinarily ending in a reverse bend and coming up through the bottom of the terminal box. This relatively short length of cable or tail is the most expensive cable in the telephone system as far as maintenance is concerned, on account of the fact the pairs of wires within the lead sheath are paper insulated, and each time the lead sheath is bent, a certain degree of crystallization of the sheath occurs, which after five or six bends leads to the development of a leak and effects the grounding of the pairs within the lead covering. Another objection to the present system of installation lies in the fact that the tail is relatively delicate and a small amount of movement of the pole, or a longitudinal shifting of the feeder, leads to a strain on the tail and its consequent rupture. A still further objection rests in the fact that each time it is necessary to replace a pole, the entire box must be removed from position, the tail must be uncleated, and some means of temporary support must be provided to prevent accidental straining of the tail. A further source of difficulty lies in the fact that the tails leading down the poles are highly susceptible to damage by lightning.

My prime object, therefore, is to provide a construction employing a relatively short tail, and to connect the terminal box fixedly to the feeder cable and to employ a loose connection between the box and the supporting strand or pole, as will hereinafter appear. With this construction, it will be evident that as the box is fixedly clamped to the feeder cable and loosely to the pole or strand, said feeder cable may move longitudinally relative to the other parts and as it will carry the box, the tail connecting the box and cable will not be subjected to any pull or strain. In this connection it is desirable to emphasize the point, that the tail is delicate, as it is merely a plurality of paper insulated wires of small diameter, all inserted within a lead sheath. The lead sheath is customarily secured at one end by a wiped joint to the feeder cable, and at the box end is usually embedded in a suitable insulating compound or in lead.

With the general object named in view, I have produced a new and improved method of supporting terminal boxes, and in order that the invention may be fully understood, reference is to be had to the accompanying drawing, in which:—

Figure 1 is a side elevation of a supporting strand and feeder cable as ordinarily supported on a pole, the terminal box of the invention being illustrated in operative position thereon.

Figure 2 is a bottom plan view of the feeder cable and terminal box.

Figure 3 is a section on the line III—III of Figure 1.

Figure 4 is a perspective view of a hanger employed with a light metallic wood-lined terminal box.

Figure 5 is a view similar to Figure 3, but illustrates the use of a heavy iron or other strong metallic terminal box.

Figure 6 is a perspective view of a slightly modified type of hanger employed when it is desirable to secure the box to the pole with a sliding connection.

In the said drawing, where like reference characters identify corresponding parts in all of the figures, 1 illustrates a telephone pole, 2 the supporting strand which is secured by cleats or clamps 3 to the pole, 4 the feeder cable, and 5 any suitable type of hanger for the suspension of the feeder cable from the strand.

When it is desired to tap the feeder cable to provide means for the taking off of service pairs, a relatively small cable or tail 6 containing the number of pairs it is desired to take off, is spliced into the feeder cable by means of a wiped joint 7, it being readily apparent that such a wiped joint containing a great number of paper covered wires is delicate and will not stand any great amount of strain without developing ruptures leading to the entry of moisture and consequent interruption of service.

The tail 6 leads through a wiped or filled nipple 9 into a suitable terminal box 10 which preferably is of such depth as to be snugly received between the strand 2 and the feeder cable 4. The terminal box 10 of the thin metal wood-lined type is supported by a pair of hangers 11 of such contour as to snugly embrace the top, bottom and back of the box, as illustrated in Figure 3, so as not to interfere with the openings 12 for the entry of the service wires 13, or with the sliding or other suitable watertight door or cover plate 14 giving access to the terminal bolts for the connection of the service wires.

In the assembly of the structure in operative position, a pair of half-pipe sections 15 are fitted on the strand 2 to provide a greater supporting area, and the opposite ends of said sections 15 are received within the horizontally looped ends 16 of the hangers 11, bolts 17 having their heads received within recessed openings 18 in one leg of the loops and passing through suitable openings in the other leg of the loop. Nuts 19 are employed on the bolts 17 to clamp the pipe sections 15 on the strand 2, the nuts being drawn sufficiently tight to prevent any tendency of the box to swing sidewise, but not tight enough to interfere with slippage longitudinally of the supporting strand.

The hangers 11 are formed on their lower horizontal portions with suitable U-shaped clamps 20 for the reception of the feeder cable 4, and after the cable has been positioned, the terminal box is slipped between the brackets and overlies the feeder cable. The bottom of the box carries a pair of stud bolts 22 for engagement with openings 23 in the hangers, and the hangers are drawn tightly to the box by means of nuts 24 to effect the clamping of the box to the feeder cable.

The assembly is now complete and as the terminal box is tightly clamped to the feeder cable and has a loose connection with the supporting strand, there may be relative movement between the strand and the cable, or movement of the pole, without placing the least strain on the tail connecting the box and the cable. It will be apparent that the connection to the supporting strand is desirable to relieve the cable of a proportion of the weight of the box and also to tie the parts together and overcome any tendency the box may have to revolve around the cable.

In Figure 5 a slightly modified form of clamping engagement between the box, supporting strand and feeder cable is illustrated. The box 25 here illustrated is a heavy metallic or cast-iron terminal box, of sufficient weight of material to be provided with a series of fixed stud bolts 26 and 27, the former being engaged with the ends of inverted U-shaped clamps 28 for securing the strand to the top of the box, and the latter engaged with the ends of U-shaped clamps 29 for tightly clamping the feeder cable to the bottom the box. The other connections and mode of operation are the same as those above-described.

In Figure 6 a slightly modified type of hanger is shown to illustrate a means of hanging the box directly to the pole, but preserving a loose connection to allow for relative movement between the pole and the feeder cable. The hangers 30 here illustrated are similar in all respects to the hangers 11, except their upper ends project upwardly as at 31 and are connected together by a horizontal bar 32. The bar 32 is provided with a suitable slot 33 substantially midway its length and is adapted to be loosely engaged on any suitable type of bolt or the like projecting from the pole. The box will thus be free to move with the feeder cable to relieve the tail of all strain. It will be apparent, however, that this method of supporting the box does not have all the advantages possessed by the method illustrated in Figures 1 to 5 inclusive, particularly that it is impossible to remove the pole without the removal of the terminal box.

From the above description, it will be apparent that I have produced a device which possesses all of the features of advantage pointed out as desirable, and while I have described and claim the preferred embodiment of the same, I reserve the right to make all changes properly falling within the spirit and scope of the appended claims.

What I claim is:—

1. A terminal box having a clamp adapted for rigid engagement with a feeder cable and also being provided with means adapted for supporting and sliding connection with a suitable support, and a tail connection between said box and cable.

2. A supporting strand, a feeder cable suspended from the strand, a terminal box, means suspending the box from the strand and allowing relative longitudinal movement between the box and the strand, means rigidly clamping the box to the cable, and a tail connection between the box and cable.

3. A supporting strand, a feeder cable suspended from said strand, a terminal box interposed between the strand and cable, brackets receiving and partially encircling said box and provided adjacent their opposite ends with loops for sliding engagement with the strand and clamping engagement with the cable, and a tail connecting said box and feeder cable.

In witness whereof I hereunto affix my signature.

WILLIAM N. FAUST.